(12) United States Patent
Zhang et al.

(10) Patent No.: US 10,834,384 B2
(45) Date of Patent: Nov. 10, 2020

(54) HEVC WITH COMPLEXITY CONTROL BASED ON DYNAMIC CTU DEPTH RANGE ADJUSTMENT

(71) Applicant: City University of Hong Kong, Kowloon (HK)

(72) Inventors: Jia Zhang, Kowloon (HK); Tak Wu Sam Kwong, Kowloon (HK)

(73) Assignee: City University of Hong Kong, Kowloon (HK)

( * ) Notice: Subject to any disclaimer, the term of this patent is extended or adjusted under 35 U.S.C. 154(b) by 129 days.

(21) Appl. No.: 15/595,395

(22) Filed: May 15, 2017

(65) Prior Publication Data

US 2018/0332278 A1 Nov. 15, 2018

(51) Int. Cl.
| | |
|---|---|
| *H04N 19/105* | (2014.01) |
| *H04N 19/593* | (2014.01) |
| *H04N 19/463* | (2014.01) |
| *H04N 19/96* | (2014.01) |
| *H04N 19/119* | (2014.01) |
| *H04N 19/136* | (2014.01) |
| *H04N 19/176* | (2014.01) |

(52) U.S. Cl.
CPC ......... *H04N 19/105* (2014.11); *H04N 19/119* (2014.11); *H04N 19/136* (2014.11); *H04N 19/176* (2014.11); *H04N 19/463* (2014.11); *H04N 19/593* (2014.11); *H04N 19/96* (2014.11)

(58) Field of Classification Search
CPC .. H04N 19/105; H04N 19/119; H04N 19/136; H04N 19/176; H04N 19/463; H04N 19/593; H04N 19/96

USPC .................................................... 375/240.02
See application file for complete search history.

(56) References Cited

U.S. PATENT DOCUMENTS

| | | |
|---|---|---|
| 8,077,777 B2 | 12/2011 | Chien et al. |
| 9,351,013 B2 | 5/2016 | El-Maleh et al. |
| 2003/0123540 A1 | 7/2003 | Zhong et al. |
| 2005/0024487 A1 | 2/2005 | Chen |

(Continued)

FOREIGN PATENT DOCUMENTS

| | | |
|---|---|---|
| CN | 101917618 | 12/2010 |
| CN | 102196254 | 3/2013 |

(Continued)

*Primary Examiner* — William C Vaughn, Jr.
*Assistant Examiner* — Jae N Noh
(74) *Attorney, Agent, or Firm* — Norton Rose Fulbright US LLP

(57) ABSTRACT

A High Efficiency Video Coding (HEVC) system that advantageously controls coding complexity at the coding tree unit (CTU) level. Complexity control is performed by adjusting a depth (or depth range) for CTUs in one or more video sequences in a video stream. To adjust CTU depth, complexity estimation and mapping is first performed to determine complexity requirements for one or more CTUs in a video frame or across frames. In doing so, a statistical complexity estimation model is utilized to yield significantly higher accuracy than other HEVC systems that operate under an assumption that each CTU consumes the same amount of encoding complexity. Complexity allocation is then utilized to ensure that each CTU is provided an optimum complexity. A probability-based CTU depth range adjustment process is utilized to select an appropriate depth range for each CTU.

18 Claims, 11 Drawing Sheets

(56) References Cited

U.S. PATENT DOCUMENTS

2008/0152009 A1    6/2008  Akyol et al.
2015/0016521 A1*  1/2015  Peng .................... H04N 19/11
                                                              375/240.12

FOREIGN PATENT DOCUMENTS

| CN | 103475880 B | * | 8/2016 |
| CN | 107071497 A | * | 8/2017 |
| WO | WO-2014138325 A1 | | 9/2014 |

* cited by examiner

HEVC WITH COMPLEXITY CONTROL BASED ON DYNAMIC CTU DEPTH RANGE ADJUSTMENT

TECHNICAL FIELD

This disclosure generally relates to video coding and, more particularly, to complexity control using coding tree unit depth range adjustment in video coding.

BACKGROUND OF THE INVENTION

The design of most video coding standards is primarily aimed at maximizing coding efficiency, which is the ability to encode video at the lowest possible bit rate while maintaining a certain level of video quality. The most recent video coding standard, High Efficiency Video Coding (HEVC), is targeted for storage and transmission of high resolution and high frame rate videos. The coding performance of a HEVC system depends upon the use of different tools, such as Coding Tree Units (CTUs), Coding Units (CUs) (which comprise CTUs), Prediction Units (PUs), Transform Units (TUs), Sample Adaptive Offsets (SAO), and the like. While beneficial in several respects, these tools dramatically increase coding complexity, which is particularly inconvenient in applications that involve battery power and/or real-time video (e.g., live video broadcasting, live video chat, etc.). That is, as coding complexity increases, so does power consumption and time delay (which is significant in, e.g., real-time video applications).

Efforts to address this problem suffer from at least two drawbacks. First, current HEVC systems treat coding complexity reduction as a fixed and limited percentage of total coding complexity. That is, these systems hold complexity reduction fixed for a group of video sequences. As a result, these systems make it difficult to balance coding complexity and performance across video sequences and frames in the sequences. Second, current HEVC systems calculate their fixed coding complexity reduction by averaging several video sequences in a video stream. However, for a given video stream, an appropriate amount of coding complexity reduction is uncertain because, e.g., greater coding complexity reduction can be achieved for video sequences comprising homogeneous content and less coding complexity reduction can be achieved for video sequences comprising rich textual and motion detail. Accordingly, these systems are not able to precisely modify coding complexity across discrete sequences of varying content.

In view of the foregoing, there is a need for a HEVC system that (1) achieves acceptable time delay in real-time applications by balancing necessary degradation in performance with any reduction in coding complexity, and (2) controls coding complexity for discrete video sequences based on available battery life and computing resources. In either case, a HEVC system is needed that can achieve an effective tradeoff between performance and coding complexity across discrete intervals according to different system conditions and parameters.

BRIEF SUMMARY OF THE INVENTION

Described embodiments provide a High Efficiency Video Coding (HEVC) system that advantageously controls coding complexity at the coding tree unit (CTU) level. Complexity control is performed by adjusting a depth (or depth range) for CTUs in one or more video sequences in a video stream. To adjust CTU depth, complexity estimation and mapping is first performed to determine complexity requirements for one or more CTUs in a video frame or across frames. In doing so, a statistical complexity estimation model is utilized to yield significantly higher accuracy than other HEVC systems that operate under an assumption that each CTU consumes the same amount of encoding complexity. Complexity allocation is then utilized to ensure that each CTU is provided an optimum complexity. A probability-based CTU depth range adjustment process is utilized to select an appropriate depth range for each CTU.

A feedback-based complexity control framework is implemented, which consists of three parts: complexity estimation, complexity allocation, and CTU depth range selection. Complexity estimation is crucial for accuracy and stability of the complexity control method because coding complexity of each CTU is closely related to its content.

A complexity allocation method allocates the complexity budget to each CTU proportionally to its estimated complexity. Given the allocated complexity of a CTU, both the minimum depth and maximum depth are adjusted to efficiently utilize the allocated complexity.

Further, complexity error is eliminated in time using a feedback mechanism. Experimental results show that the inventive concepts outperform other systems in complexity control accuracy and complexity control stability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

Figure 9:
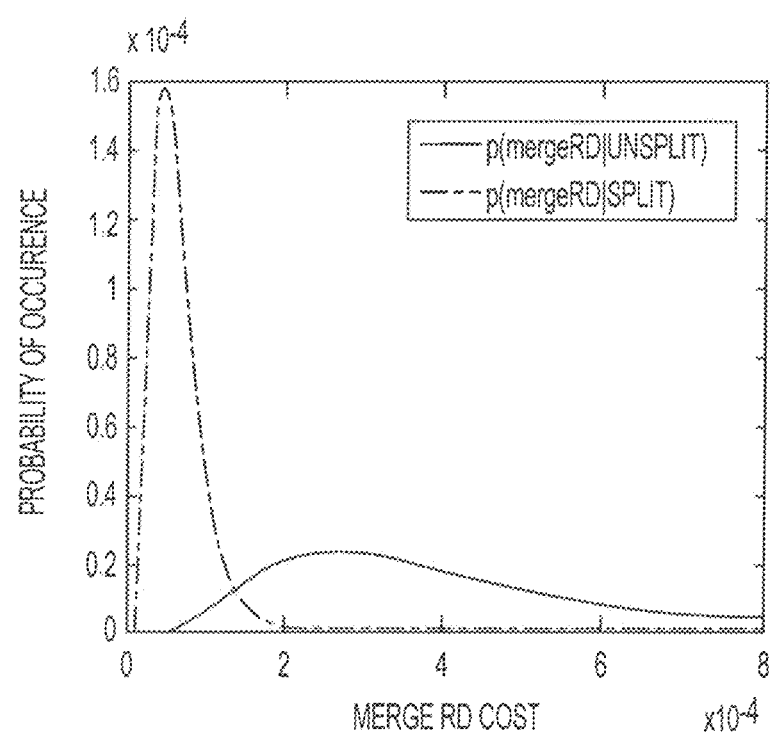
Figure 10A:
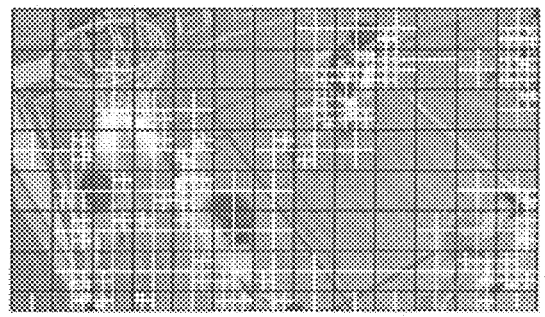
Figure 10B:
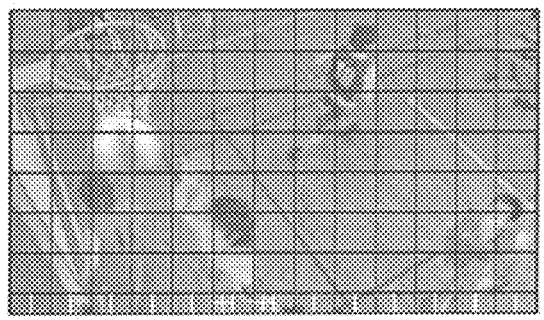
Figure 10C:
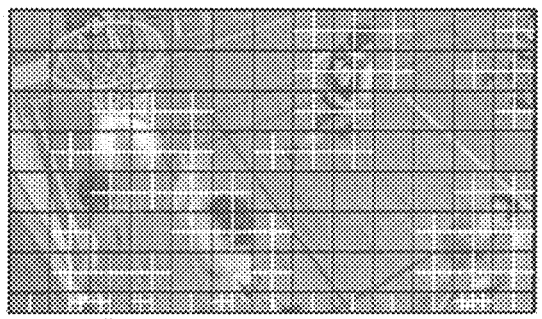
Figure 10D:
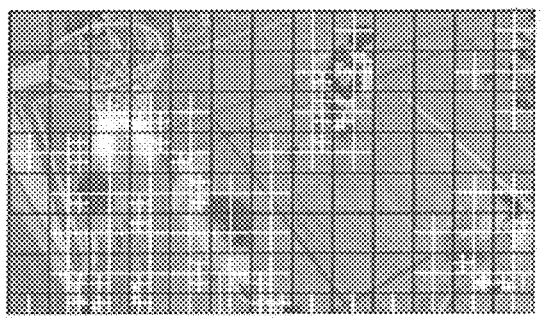
Figure 10E:
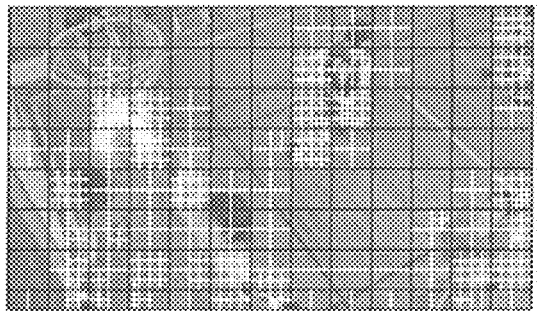
Figure 11A:
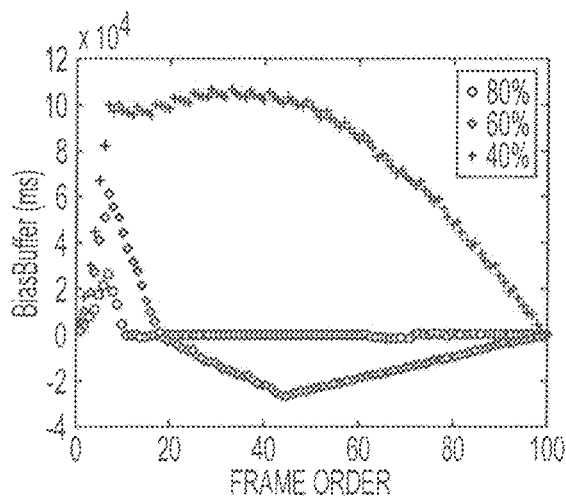
Figure 11B:
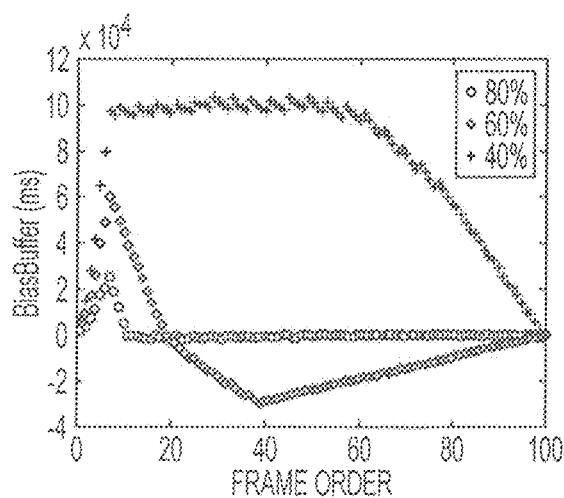
Figure 11C:
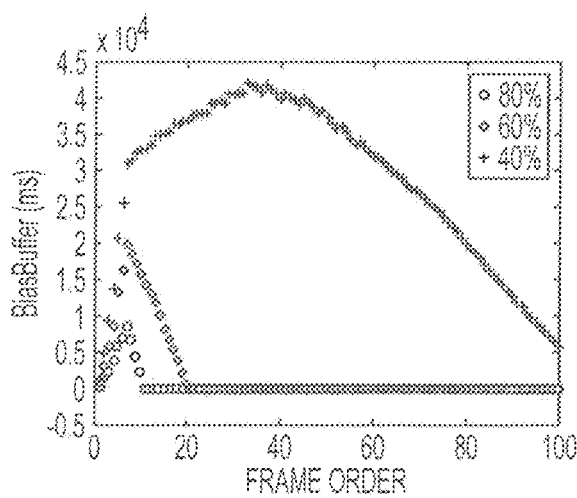
Figure 11D:
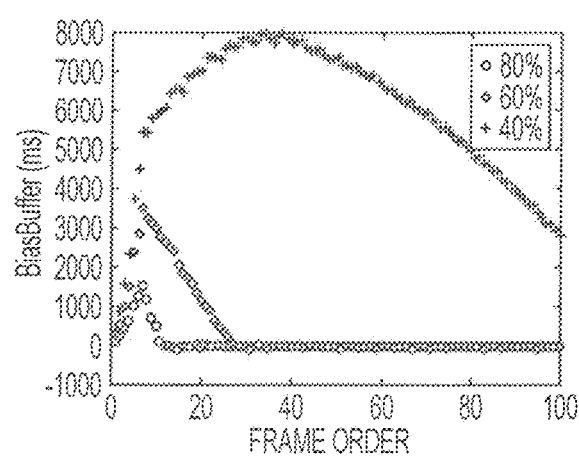

PDFs of a merge rate-distortion cost conditioned on different AMD values according to embodiments described herein;

FIG. 9 shows PDFs of a merge rate-distortion cost conditioned on whether a CU is optimal with size equal to 64, QP equal to 22, and temporal layer equal to 3 according to embodiments described herein;

FIG. 10A shows CU partitioning results of an encoded frame produced by an original encoder without complexity constraint according to embodiments described herein;

FIG. 10B shows CU partitioning results of an encoded frame produced by a Correa DCC process according to embodiments described herein;

FIG. 10C shows CU partitioning results of an encoded frame produced by a Deng TCSVT process according to embodiments described herein;

FIG. 10D shows CU partitioning results of an encoded frame produced by a Amaya TMM process according to embodiments described herein;

FIG. 10E shows CU partitioning results of an encoded frame having CUs with varying depths according to embodiments described herein;

FIG. 11A shows bias buffer time as a function of frame order for a first set of buffer time values with different target complexity ratios according to embodiments described herein;

FIG. 11B shows bias buffer time as a function of frame order for a second set of buffer time values with different target complexity ratios according to embodiments described herein;

FIG. 11C shows bias buffer time as a function of frame order for a third set of buffer time values with different target complexity ratios according to embodiments described herein; and FIG. 11D shows bias buffer time as a function of frame order for a fourth set of buffer time values with different target complexity ratios according to embodiments described herein.

DETAILED DESCRIPTION OF THE INVENTION

Described embodiments provide High Efficiency Video Coding (HEVC) and advantageously control coding complexity at the coding tree unit (CTU) level. While known HEVC encoders hold coding complexity of CTUs in a video sequence constant, described embodiments provide encoders that adjust coding complexity across individual CTUs in a video sequence, or frames in the sequence. Embodiments utilize a complexity control scheme that maximizes performance while enabling achievement of a given target complexity ratio for a video sequence. The target ratio can be adjusted by an application, a user, and/or otherwise specified for particular purposes. When enabled for a HEVC encoder, embodiments adjust coding complexity of a video sequence, frames within the sequence, and CTUs within the frames, while maintaining performance at a desired level.

Complexity control is performed by adjusting a depth (or depth range) for CTUs in one or more video sequences in a video stream. To adjust CTU depth, complexity estimation and mapping is first performed to determine complexity requirements for one or more CTUs in a video frame or across frames. In doing so, a statistical complexity estimation model is utilized to yield significantly higher accuracy than other HEVC systems that operate under an assumption that each CTU consumes the same amount of encoding complexity. Complexity allocation is then utilized to ensure that each CTU is provided an optimum complexity.

A probability-based CTU depth range adjustment process is utilized to select an appropriate depth range for each CTU, which represents a significant change in approach from known systems that require partitioning for individual CTUs (and smaller individual coding units (CUs) comprising each CTU) to begin from a depth of zero (0). Also, a feedback-based complexity control framework is utilized to provide an effective mechanism for simultaneously controlling complexity and maximizing performance.

Embodiments are thought to be particularly advantageous for various video-related multimedia services, especially those that require real-time performances and have a strict time delay requirement, such as live video broadcasting or live video chatting. Other applications that will benefit from described embodiments include those that operate on platforms with limited power and computing resources, such as video coding applications on smart phones and drones. On such platforms, embodiments are able to adjust coding complexity in response to the battery level and available computing resource.

Figure 1:
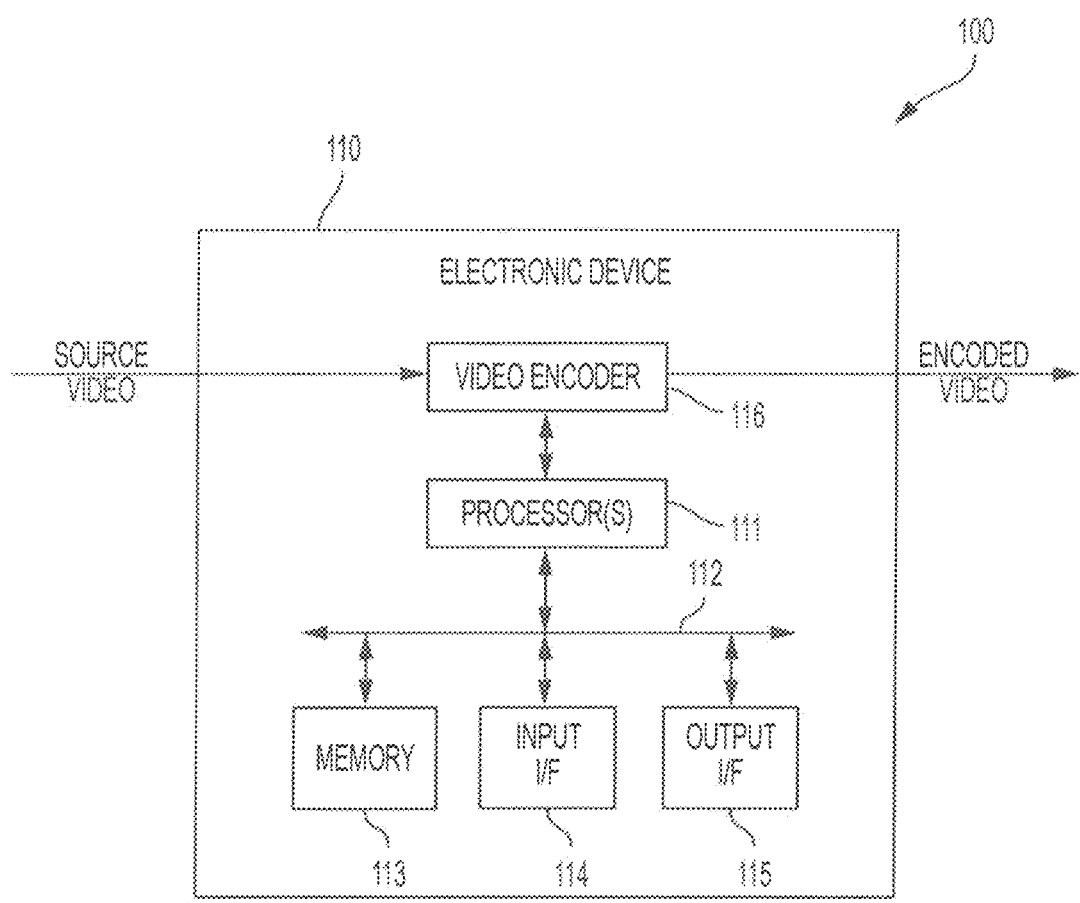
FIG. 1 shows a HEVC system according to embodiments described herein.

FIG. 1 shows an exemplary system adapted to provide High Efficiency Video Coding (HEVC) in accordance with the concepts herein. In particular, system 100 comprises electronic device 110 adapted to provide video encoding by implementing complexity control as described herein. In doing so, electronic device 110 enables coding complexity control for individual CTUs across video sequences and video frames at the CTU level. Here, it should be appreciated that a CTU is a basic processing unit of a HEVC video standard and conceptually corresponds in structure to macroblock units that were used in several previous video standards.

Electronic device 110 can comprise various configurations of devices. For example, electronic device 110 can comprise a computer, a laptop computer, a tablet device, a server, a dedicated spatial processing component or device, a smartphone, a personal digital assistant (PDA), an Internet of Things (IOTA) device, a network equipment (e.g., router, access point, femtocell, Pico cell, etc.), a set-top-box, a cable headend system, a smart television (TV), and/or the like. Irrespective of the particular implementation, electronic device 110 of embodiments provides video coding complexity control with respect to source video to provide HEVC encoded video. The source video can comprise video captured by one or more image capture devices of or connected to electronic device 110, video provided to electronic device 110 from another source (e.g., file server, remote image capture device, cable headend system, etc.), such as via one or more network connections (e.g., local area network (LAN), metropolitan area network (MAN), wide area network (WAN), the Internet, a wireless LAN (WLAN), a cellular network, a cable transmission system, the public switched telephone network (PS TN), etc.), and/or stored by the electronic device (e.g., in a video database of a memory thereof). The encoded video may be provided to one or more other components, electronic devices and/or other systems (e.g., a memory, a video decoder, a radio transmitter, a network interface card, a computer, a laptop computer, a tablet device, a server, a dedicated spatial processing component or device, a smartphone, a PDA, an IOTA device, a network equipment, a set-top-box, a cable headend system, a smart TV, such as via one or more direct and/or network connections (e.g., LAN, MAN, WAN, WLAN, a cellular network, a cable transmission system, the PS TN, etc.), for storage, playback, broadcast, distribution, etc.

Electronic device 110 can comprise any number of components operable to facilitate functionality of electronic device 110 in accordance with the concepts herein, such as processor(s) 111, system bus 112, memory 113, input interface 114, output interface 115, and video encoder 116 of the illustrated embodiment. Processor(s) 111 can comprise one or more processing units, such as a central processing unit (CPU) (e.g., a processor from the Intel CORE family of multi-processor units), a field programmable gate array (FPGA), and/or an application specific integrated circuit (ASIC), operable under control of one or more instruction sets defining logic modules configured to provide operation as described herein. System bus 112 couples various system components, such as memory 113, input interface 114, output interface 115 and/or video encoder 116 to processor(s) 111. Accordingly, system bus 112 of embodiments may be any of various types of bus structures, such as a memory bus or memory controller, a peripheral bus, and/or a local bus using any of a variety of bus architectures. Additionally or alternatively, other interface and bus structures, such as a parallel port, game port or a universal serial bus (USB) may be utilized. Memory 113 can comprise various configurations of volatile and/or non-volatile computer-readable storage media, such as RAM, ROM, EPSOM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Input interface 114 facilitates coupling one or more input components or devices to processor(s) 111. For example, a user may enter commands and information into electronic device 110 through one or more input devices (e.g., a keypad, microphone, digital pointing device, touch screen, etc.) coupled to input interface 114. Image capture devices, such as a camera, scanner, 3-D imaging device, etc., may be coupled to input interface 114 of embodiments, such as to provide source video herein. Output interface 115 facilitates coupling one or more output components or devices to processor(s) 111. For example, a user may be provided output of data, images, video, sound, etc. from electronic device 110 through one or more output devices (e.g., a display monitor, a touch screen, a printer, a speaker, etc.) coupled to output interface 115. Output interface 115 of embodiments may provide an interface to other electronic components, devices and/or systems (e.g., a memory, a video decoder, a radio transmitter, a network interface card, devices such as a computer, a laptop computer, a tablet device, a server, a dedicated spatial processing component or device, a smartphone, a PDA, an IOTA device, a network equipment, a set-top-box, a cable headend system, a smart TV, etc.).

Because HEVC dramatically increases video coding complexity, it is difficult to utilize in real-time video applications or applications that are subject to limited battery power. To address the foregoing problems, video encoder 116 intelligently trades coding efficiency and coding complexity in a flexible and efficient manner. Accordingly, embodiments of video encoder 116 encode source video according to HEVC using a complexity control technique that reduces latency and power consumption. Concepts described herein can, for example, be used in various video communication systems and real-time video streaming applications, such as cable TV programs, video-on-demand (VOD), live TV, videos over the Internet, and real-time video chat on computers or portable devices.

System 100 enables a novel HEVC complexity control framework, which provides an effective processing flow for solving complexity control problems. Specifically, CTU-level complexity estimation is performed and a statistical model is derived. System 100 provides higher accuracy than known HEVC systems, which operate under the assumption that all CTUs have the same complexity. As will be described in more detail herein, the inventive concepts encompass allocating a complexity budget for each CTU, in proportion to each CTU's estimated complexity. Further, a bit-time model is utilized to estimate the coding complexity for each CTU. In operation of system 100, it is recognized that the complexity demand of a CTU is highly related to its content. Accordingly, system 100 includes a complexity allocation scheme where complexity for each CTU is allocated in proportion to its estimated complexity.

System 100 also includes CTU depth range adjustment that excludes a CTU depth with less coding gain. This can be performed using a Bayesian approach where both the minimum depth and maximum depth of a CTU are simultaneously adjusted. This represents a departure from known HEVC complexity control systems, which require that a CTU should always be checked from Depth 0.

Figure 2A:
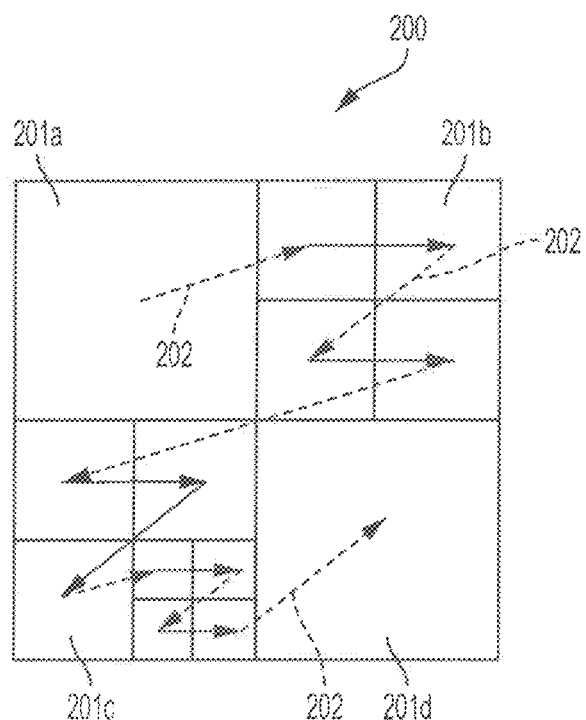
FIG. 2A shows a block-style CU partitioning solution of a CTU according to embodiments described herein.
Figure 2B:
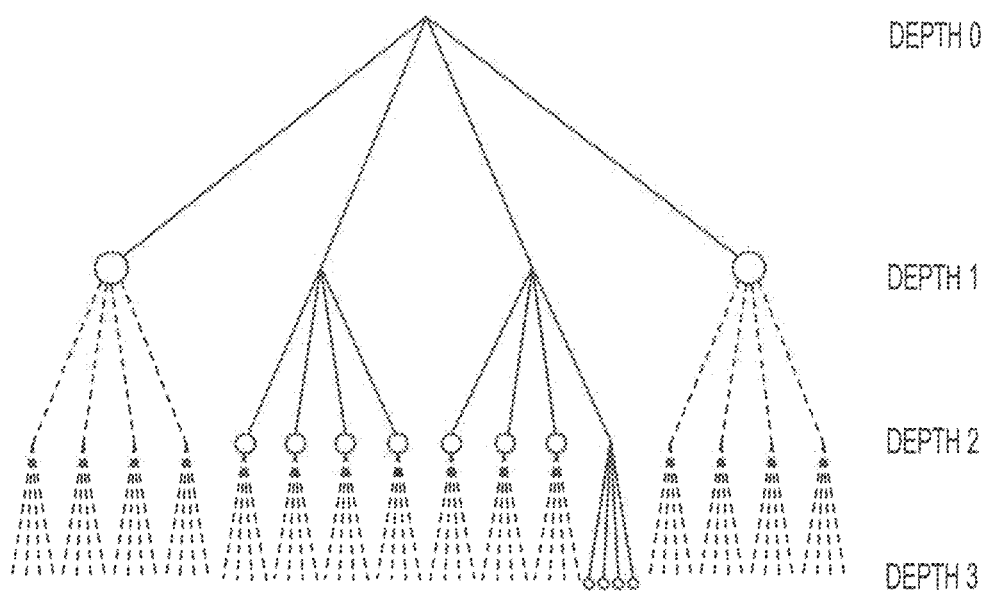
FIG. 2B shows a quadtree of a CU partitioning solution of a CTU according to embodiments described herein.

To further explain the inventive concepts, it is helpful to briefly discuss HEVC partitioning structures and some of their characteristics. HEVC utilizes a block-based coding structure in which a video frame is first partitioned into a sequence of basic coding units with the same square size, i.e., Coding Tree Units (CTUs). Referring to FIGS. 2A and 2B, CTU 200 can be further split into a series of smaller Coding Units (CUs) $201_a$-$201_d$ based on a quadtree structure. The supported CU sizes include 8×8, 16×16, 32×32, and 64×64. As such, for a CTU having a quadtree structure size 64×64, the depth ranges are $\{0, 1, 2, 3\}$.

HEVC encoders have flexibility to determine their own CU partitioning strategies, as long as the format of the output conforms to the HEVC standard. To maximize performance, HEVC reference software, e.g., HEVC Test Model (HM) 16.9, employs a brute-force method that traverses the full quadtree in a depth-first order to obtain the best CU partitioning solution. All CUs $201_a$-$201_d$ with the same depth are encoded in a Z-order, which ensures that the above and left neighboring CUs have been encoded when encoding the current CU. For each CU $201_a$-$201_d$, the rate-distortion cost C is determined to evaluate the partitioning solution, which is calculated as:

$$C=D+\lambda B \quad (1)$$

where D is the Sum of Squared Error (SSE) between the reconstructed CU and the original CU, which is used to indicate the visual distortion. The total bit consumption is represented as the symbol B and λ is the Lagrangian multiplier.

When the maximum depth is reached, the HM encoder will prune the quadtree based on a bottom-up manner. More specifically, the total rate-distortion cost of the four (4) sub-CUs will be compared with that of their parent CU recursively to determine whether a decision to split should be made.

A block-style CU partitioning solution of CTU 200 is shown in FIG. 2A, where the encoding order (Z-order) is indicated with arrow symbols 202. In FIG. 2B, the corresponding quadtree structure is illustrated. The encoder will traverse all nodes, with the total quantity up to 85 ($4^0+4^1+4^2+4^3$). After the rate-distortion cost comparison, the branches expressed with dashed lines are pruned.

Also, a CU contains one or more PUs, which are the basic units for prediction, the HEVC standard specifies eight (8) PU partition patterns for a CU, including symmetric partition patterns and asymmetric partition patterns. All PUs in a CU share the same prediction type (intra-prediction or inter-prediction), while all the samples in a PU share the same set of coding parameters, such as Motion Vectors (MVs) for inter prediction and angular modes for intra prediction. In the encoding process of HM encoders, all eight (8) PU partition patterns will be traversed for a CU. The one (1) with the optimal rate-distortion cost will be selected and its rate-distortion cost will be regarded as the rate-distortion cost for the CU. For most of the inter PUs, the Motion Estimation (ME) should be performed ahead to derive the MVs. However, when checking the merge mode, no ME will be performed and the MVs are inherited from the neighboring PUs. As a special case of merge mode, the skip mode neither performs the ME nor encodes the residuals, which assumes that the prediction performance is flawless and all residuals are zero (0).

According to embodiments, complexity estimation for each CTU is performed and the coding complexity of each CTU depth is then mapped to a proportion of the total coding complexity of a CTU. CTU coding complexity is directly related to, and can be measured by, the time required to encode the CTU. However, because an exact coding complexity or encoding time for a video sequence is unknown until the encoding process is actually finished, complexity estimation and mapping is essential for accurate complexity control.

Inventive concepts take advantage of the observation that coding complexity, and therefore encoding time, greatly varies across CTUs that have different visual characteristics. This can be explained with reference to FIG. 3, which shows an exemplary frame of a video sequence 301. CTUs $302_a$-$302_n$ are separated by CTU boundary lines 303 while boundary lines 304 partition CUs 305 within CTUs $302_a$-$302_n$. Encoding times 306, which represent the time required to encode each CTU, are imprinted on each of CTUs $302_a$-$302_n$. According to embodiments, encoding time 306 and can be expressed, e.g., by the function clock ( ) on the visual C++ platform.

Figure 3:
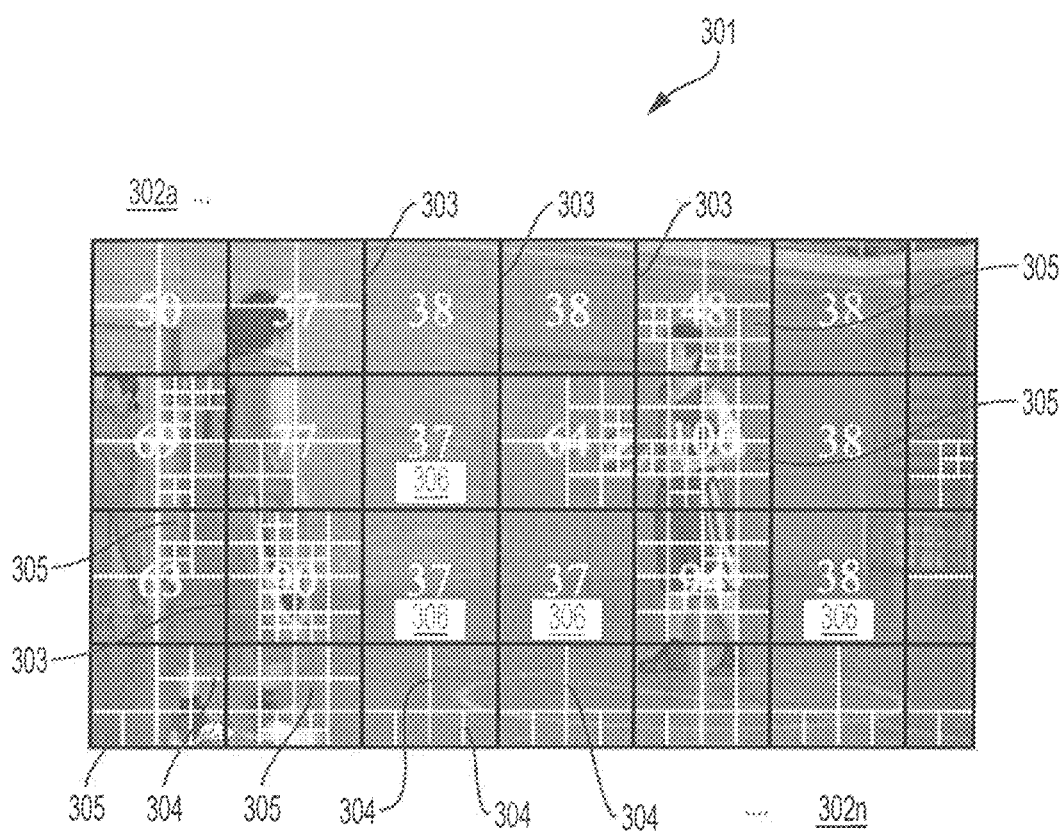
FIG. 3 shows a frame of a video sequence with encoding times for CTUs in the frame according to embodiments described herein.

As seen in FIG. 3, CTUs that include more detail generally require more time to encode than CTUs that include less detail. This can also be demonstrated using the reference software/hardware for HEVC (HEVC Test Model), which is commonly referred to as an HM encoder. According to experimental results where the encoder is HM-16.9 and the Quantization Parameter (QP) is set to 27, CTUs with more detail generally consume more time to encode. Consistent with the foregoing, at FIG. 3, complex CTUs 302 are generally associated with a higher encoding time 306, while less complex CTUs 302 are generally associated with a lower encoding time 306. This is also verified by investigating the relationship between consumed bits of PU mode, merge 2N×2N, at Depth 0 and the encoding time of a corresponding CTU.

Figure 4A:
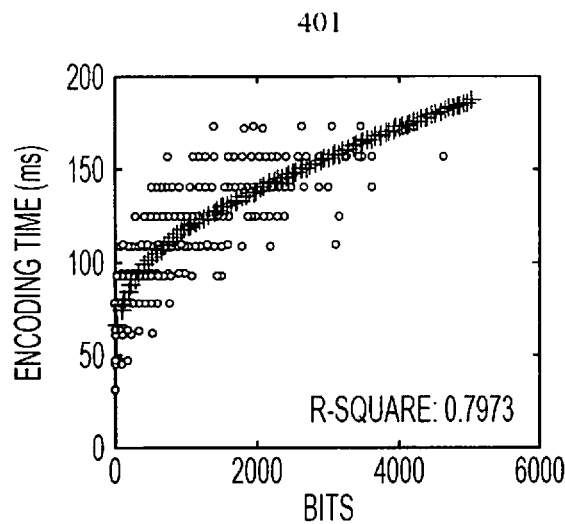
FIG. 4A shows a relationship between bits and encoding time of CTUs in a first exemplary video sequence according to embodiments described herein.
Figure 4B:
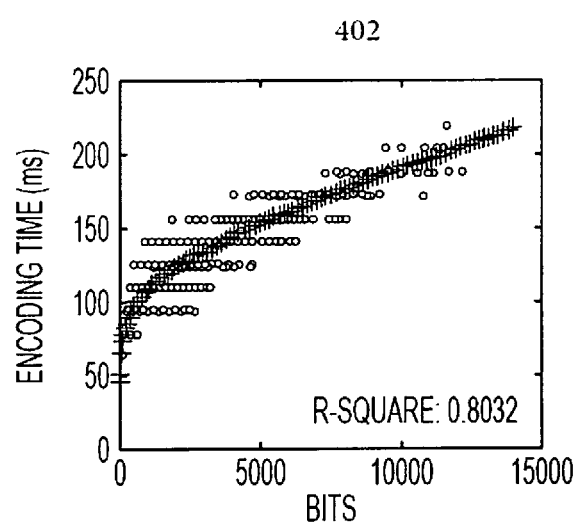
FIG. 4B shows a relationship between bits and encoding time of CTUs in a second exemplary video sequence according to embodiments described herein.
Figure 4C:
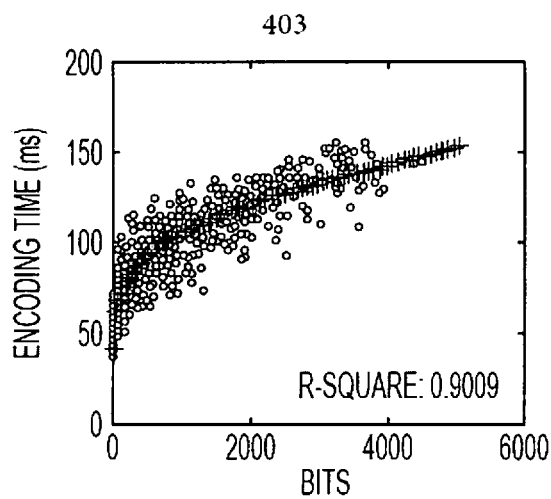
FIG. 4C shows a relationship between bits and encoding time of CTUs in a third exemplary video sequence according to embodiments described herein.
Figure 4D:
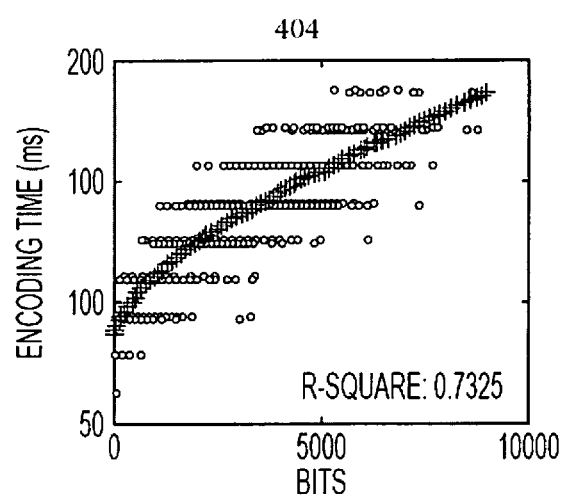
FIG. 4D shows a relationship between bits and encoding time of CTUs in a fourth exemplary video sequence according to embodiments described herein.

FIGS. 4A-4D illustrate bit-time relationships for four (4) test video sequences with various content. FIG. 4A illustrates a relationship between bits and encoding time of CTUs in a first exemplary video sequence labeled "Basketball Drive" 401. FIG. 4B illustrates a relationship between bits and encoding time of CTUs in a second exemplary video sequence labeled "Party Scene" 402. FIG. 4C illustrates a relationship between bits and encoding time of CTUs in a third exemplary video sequence labeled "Catus" 403. FIG. 4D illustrates a relationship between bits and encoding time of CTUs in a fourth exemplary video sequence labeled "Race Horses C" 404. It can be seen that bit-time relationships 401-404 very closely track a logarithmic curve. Therefore, a bit-time relationship can be expressed as:

$$T=a*\ln(B+b)+c*B \quad (2)$$

where T is the encoding time of a CTU and B is the bits consumed by the PU mode merge 2N×2N at Depth 0. A least square method can be employed to derive the three (3) parameters: a, b, and c online to better adapt to the video content.

According to embodiments, a number of initial frames of a video sequence are treated as "training frames" that are encoded by the original HM encoding process. During a training phase, N number of samples are collected. The $i_{th}$ sample is denoted as $(x_i; y_i)$, where $x_i$ is the coding bits of the merge mode and $y_i$ is the coding time of a CTU. Then the squared error for the $i_{th}$ sample, $L_i$, is $$L_i = \frac{1}{2}(a\ln(x_i + b) + cx_i - y_i)^2, \quad (3)$$

and the mean squared error for the data set L is $$L = \frac{1}{N}\sum_{i=1}^{N} L_i. \quad (4)$$

Next, the partial derivatives of L with respect to a, b, and c, respectively, are calculated as:

$$\frac{\partial L}{\partial a} = \sum_{i=1}^{N} \frac{\partial L_i}{\partial a} = \sum_{i=1}^{N} (a\ln(x_1+b) + cx_i - y_i)\ln(x_i+b)) \quad (5)$$

$$\frac{\partial L}{\partial b} = \sum_{i=1}^{N} \frac{\partial L_i}{\partial b} = \sum_{i=1}^{N} \frac{a*\ln(x_i+b)+c*x_i-y_i}{x_i+b} \quad (6)$$

$$\frac{\partial L}{\partial c} = \sum_{i=1}^{N} \frac{\partial L_i}{\partial c} = \sum_{i=1}^{N} x_i(a*\ln(x_i+b)+c*x_i-y_i). \quad (7)$$

However, no closed form solutions can be derived if directly setting all three (3) derivatives to zero (0). As such, the gradient descent algorithm ("Algorithm 1") is employed to derive the approximate solutions and the pseudo codes are listed:

---
Algorithm 1 Gradient-descent algorithm for parameters determination
---
Input: N samples;
Output: Approximate solutions for parameters a, b, and c,
   1: Initialize a to 10, b to 10 and c to 0;
   2: Initialize STa to 0.001, STb to 0.001 and STc to 0.00000001;
   3: Calculate $\angle 0$ using Eq. (4)
   4: Initialize $\angle$ to 0;
   5: while $\frac{|L0-L|}{L0} > 0.000001$ do
   6:   Calculate $\frac{\partial L}{\partial a}, \frac{\partial L}{\partial b}$ and $\frac{\partial L}{\partial b}$ using Eq. (5), Eq. (6) and (7);
   7:   $a = a - STa*\frac{\partial L}{\partial a}, b = b - STb*\frac{\partial L}{\partial b}, c = c - STc*\frac{\partial L}{\partial c};$
   8:   L0 = L;
   9:   Update $\angle$ using Eq. (4);
  10: end while According to experimental results, less than one (1) second is required for convergence and Algorithm 1 must be executed only once after the training phase. As such, any additional time required to determine the parameters to a, b, and c is negligible.

Also, because coding complexity is controlled to adjust CTU depth range, determining the coding complexity of each CTU depth is also very important for accurate complexity control. As such, according to embodiments, the complexity percentage of each CTU depth can be determined using, e.g., the HM-16.9 encoder with the "encoder_lowdelay_P_main" configuration. This percentage can be expressed as:

$$P(i) = \frac{C(i)}{C_{CTU}} \quad i \in \{0, 1, 2, 3\}, \quad (8)$$

where P(i) is the complexity percentage of the Depth i and C(i) is the exact encoding time of Depth i. The denominator $C_{CTU}$ is the total encoding time of the corresponding CTU.

TABLE I lists the results for test sequences 401-404 shown in FIGS. 4A-4D where each are encoded Quantization Parameter (QP) equal to 27. In Table I, "Mean" is the mean value of the complexity percentage of the corresponding CTU depth and "Std" is the standard deviation.

TABLE I

Complexity mapping results for each CTU depth

| Test sequences | Depth 0 | | Depth 1 | | Depth 2 | | Depth 3 | |
|---|---|---|---|---|---|---|---|---|
| | Mean | Std | Mean | Std | Mean | Std | Mean | Std |
| BasketballDrive | 0.1769 | 0.0275 | 0.2346 | 0.0321 | 0.2778 | 0.0330 | 0.3084 | 0.0461 |
| PartyScene | 0.1686 | 0.0282 | 0.2431 | 0.0258 | 0.2979 | 0.0269 | 0.2881 | 0.0345 |
| Cactus | 0.1725 | 0.0276 | 0.2261 | 0.0348 | 0.2789 | 0.0353 | 0.3194 | 0.0515 |
| RaceHorsesC | 0.1685 | 0.0231 | 0.2484 | 0.0233 | 0.3007 | 0.0267 | 0.2806 | 0.0321 |
| Average | 0.1716 | 0.0266 | 0.2381 | 0.0290 | 0.2888 | 0.0305 | 0.2991 | 0.0411 |

As seen, the first depth (Depth 0) has the least complexity percentage and the complexity percentage gradually increases as the order number of CTU depth increases. The standard deviation is far less than the mean value, which can demonstrate that it is reasonable to regard the mean value as the complexity mapping result of each CTU depth. Specifically, according to embodiments, the mean values of the complexity percentage are calculated during the training phase, which can better adapt to different video content.

While not required, some embodiments can be implemented in two (2) phases: (1) a training phase, and (2) a testing phase. With regard to the training phase, initial QPs for frames on different temporal layers are slightly different, which follows the rule:

$$QP_k = QPI + k, \quad (9)$$

where QPI is the QP for I frames and k is the serial number of a temporal layer. For this reason, frames on different temporal layers are trained separately.

Figure 5:
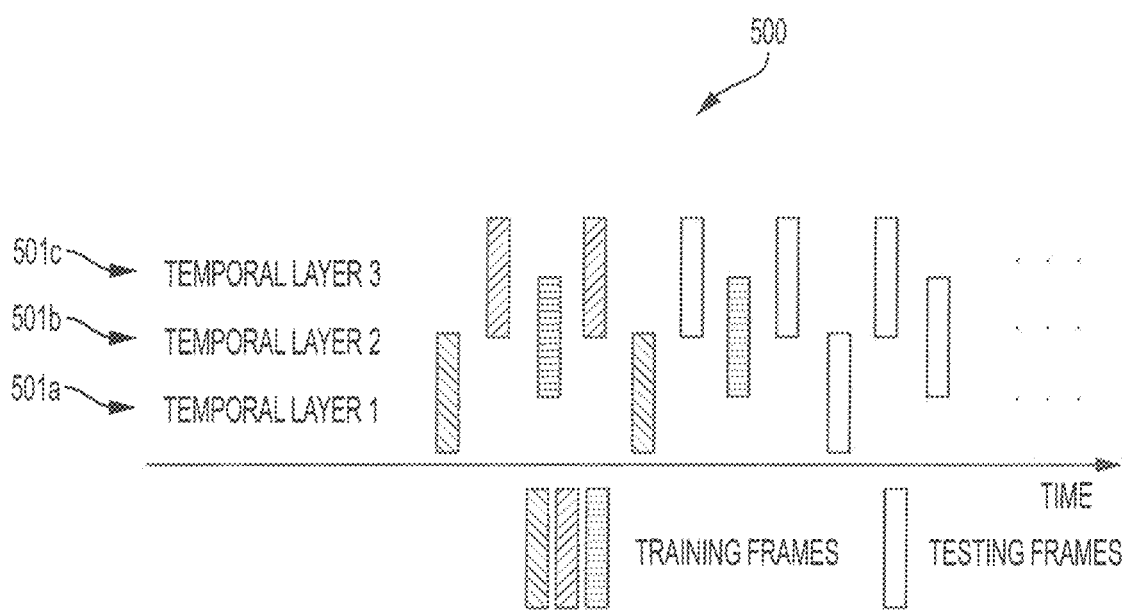
FIG. 5 shows a training structure of a complexity control method according to embodiments described herein.

FIG. 5 shows exemplary training structure 500, where the first two (2) frames of each temporal layer 501$_a$-501$_c$ are used for training. In the training phase, the encoding process is the same as that of HM-16.9, or that of whatever encoder is chosen, and sample data is collected for complexity estimation and complexity mapping.

Figure 6:
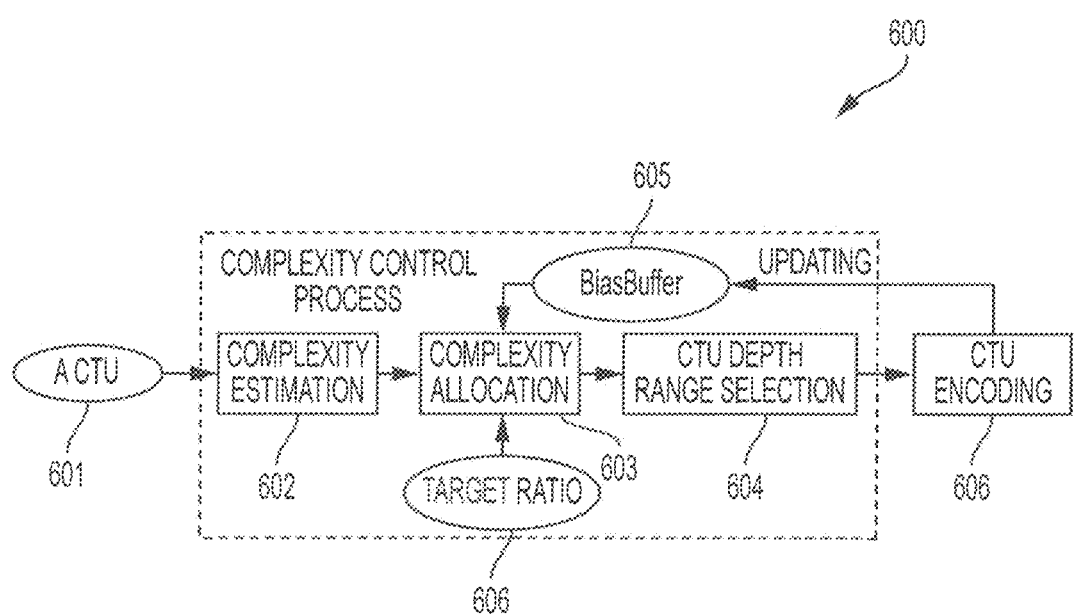
FIG. 6 shows a diagram of a feedback-based complexity control framework according to embodiments described herein.

FIG. 6 shows aspects of a complexity control process 600 for encoding CTU 601 according to embodiments. The process shown in FIG. 6 is based on a feedback mechanism and is characterized by at least three (3) parts: (1) complexity estimation block 602, (2) complexity allocation 603, and (3) CTU depth range selection block 604. Variable BiasBuffer 605 is used to record complexity error between target complexity and actual consumed complexity. Considering a time required by the training frames of $T_{tr}$ and target complexity ratio 606 of r, then an initial value of BiasBuffer 605 is initially set to $(1-r)*T_{tr}$.

At block 602, complexity estimation is performed for a CTU to be encoded and an estimated complexity $T_E$ is obtained. At the same time or thereafter, BiasBuffer 605 is updated as $$BiasBuffer=BiasBuffer+(1-r)*T_{merge}, \quad (10)$$

where $T_{merge}$ is the required time of checking the PU mode merge 2N×2N at Depth 0.

At block 603, allocated complexity $T_A$ is allocated to the CTU to be encoded. This is calculated as:

$$T_A = r*T_E - \frac{BiasBuffer}{n_{CTU}}, \quad (11)$$

where $n_{CTU}$ is the number of remaining CTUs to be encoded in the sequence. The values of BiasBuffer 605 and $n_{CTU}$ are then updated as $$BiasBuffer = BiasBuffer - \frac{BiasBuffer}{n_{CTU}}, \quad (12)$$

$$n_{CTU} = n_{CTU} - 1. \quad (13)$$

It should be appreciated that in Equation (11) the allocated complexity $T_A$ consists of two (2) parts:

$$r*T_E \text{ and } \frac{BiasBuffer}{n_{CTU}}$$

The first part is included based on the concept that a CTU with greater $T_E$ should be allocated more complexity because it is predicted to have low prediction performance and likely requires more complexity to achieve an acceptable rate-distortion performance. The second part, $$\frac{BiasBuffer}{n_{CTU}}$$

represents an error elimination, by which the complexity error is gradually eliminated over subsequent CTUs. The ideal result is that the value of BiasBuffer 605 equals to zero (0) after the last CTU of a video sequence is encoded. At the end of the encoding process of a current CTU, the actual required time of the CTU, $T_c$, is obtained, and BiasBuffer 605 is updated again by:

$$BiasBuffer=BiasBuffer+(T_c-T_A). \quad (14)$$

As a result of the foregoing complexity estimation and allocation, the encoding complexity of each CTU depth is mapped to a certain complexity ratio. Complexity ratios for Depth 0, Depth 1, Depth 2, and Depth 3 are denoted as $C_0$, $C_1$, $C_2$, and $C_3$, respectively.

After allocation is performed by complexity allocation block 603, the allocated complexity $T_A$ for a CTU is expressed in accordance with Equation (11). The available complexity ratio of the CTU, $r_a$, can then be defined as:

$$r_a = \frac{T_A}{T_E}. \quad (15)$$

Given an allocated complexity budget, embodiments control coding complexity at each CTU by taking advantage of the flexibility of CU partitioning provided in the HEVC standard. In other HEVC complexity control systems based on CTU range adjustment, (1) the encoding process always starts from Depth 0, and (2) only the maximum depth changes. However, it is very inefficient to fix the starting depth level to zero (0) in dealing with CTUs that are divided into smaller CUs.

For example, consider an optimal CU partitioning solution of CTU 100 shown in FIG. 1. CTU 100 includes CUs of smaller sizes 32×32, 16×16, and 8×8. If the encoding process always started from Depth 0, all four (4) CTU depth levels would require traversal in order to obtain the optimal rate distortion performance. However, when the allocated complexity only allows the encoder to check three (3) CTU depth levels, no degradation occurs if the encoder sets the CTU depth range to {1, 2, 3} rather than {0, 1, 2}. Accordingly, embodiments include an adaptive CTU depth range selection process in which both the minimum depth and the maximum depth of a CTU are adjustable.

In Table II, all the possible CTU depth ranges are listed.

TABLE II

All the depth range candidates.

| Number of depth levels | Depth range candidates | | | |
|---|---|---|---|---|
| 1 | {0} | {1} | {2} | {3} |
| 2 | {0, 1} | {1, 2} | {2, 3} | {3, 4} |
| 3 | {0, 1, 2} | {1, 2, 3} | | |
| 4 | (0, 1, 2, 3} | | | |

For each depth range candidate, the minimum complexity ratio is calculated based on the complexity mapping results. For example, the minimum required complexity ratio for the depth range candidate {1, 2, 3} is $C_1+C_2+C_3$. Together with the available complexity ratio $r_a$, the set of available CTU depth range candidates can be generated.

Generally, CTUs with more textual details and motion are split into a series of smaller CUs and have a higher rate-distortion cost. It is helpful to define the concept of "Actual Maximum Depth" (AMD) as the CTU depth to which the CU with the smallest size in the partitioning solution belongs. For example, if the minimum CU size in the partition solution of a CTU is 16×16, then the AMD of the CTU is 2.

A determination of the relationship between the AMD and the merge rate-distortion cost at Depth 0 of a CTU has been made using encoder HM-16.9 having a "encoder lowdelay P main" configuration and the following testing sequences: Cactus, BasketballDrive, Race-HorsesC, PartyScene, BQSquare, and FourPeople.

Consistent with the foregoing, at block 604, given a set of the available CTU depth range candidates $\Omega$, the optimal depth range is determined by checking the possibility that it contains the AMD of the CTU. The objective can be expressed as:

$$S_o = \arg\max_{s} \Sigma_{d \in s} p(AMD=d|mergeRD)S \in \Omega, \quad (16)$$

where $S_o$ is the optimal depth range candidate and S is a depth range candidate belonging to $\Omega$. The expression p(AMD=d|mergeRD) is a posterior probability, where d is a depth element in S and mergeRD is the rate-distortion cost of PU mode merge 2N×2N at Depth 0. The Bayes' rule is employed to derive this posterior probability, which is formulated as $$p(AMD = d \mid J_m) = \frac{p(J_m \mid AMD = d)p(AMD = d)}{\sum_{i=0}^{3} p(J_m \mid AMD = i)p(AMD = i)} \quad (17)$$

$$d \in \{0, 1, 2, 3\}$$

where all the likelihood probabilities can be derived offline and the prior probabilities can be calculated during the training phase. It is then straightforward to conclude that if the full-search candidate ({0, 1, 2, 3}) is in Ω, then it must be the optimal solution because p(AMD=d|mergeRD) equals to the maximum value 1, which is expected.

A special case involves processing non-square CTUs on the boundary of a video frame. Embodiments optionally involve a modified encoding process as such CTUs make up only a small proportion of any given video frame. In such case, BiasBuffer 605 is updated as $$\text{BiasBuffer=BiasBuffer}+(1-r)^*T_A. \quad (18)$$

At block 606, CTU encoding is updated and parameter values, such as the value of BiasBuffer 605, are fed back to prior blocks for the acceleration of error elimination and the like.

Figure 7:
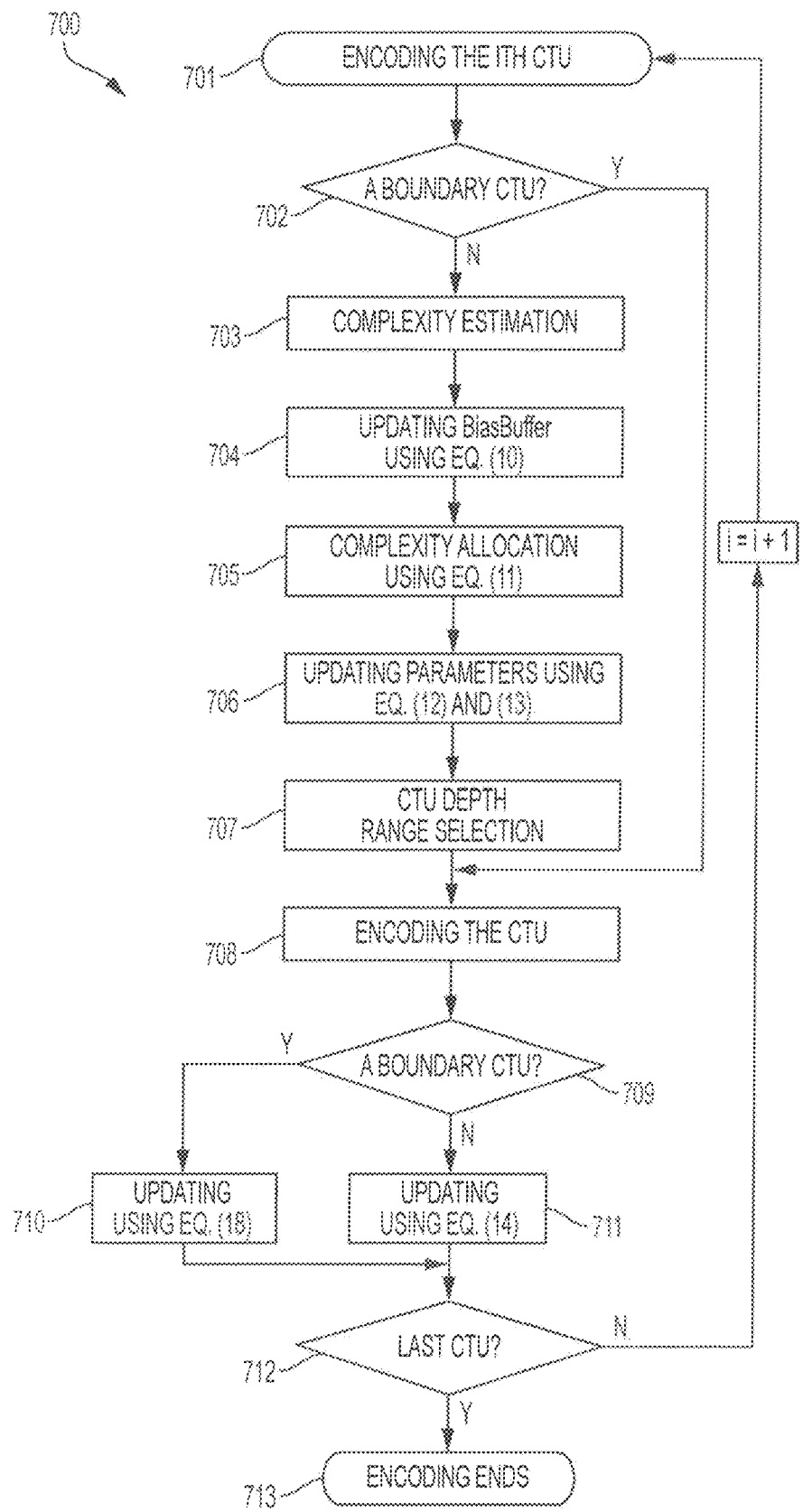
FIG. 7 shows a flowchart of a complexity allocation method according to embodiments described herein.

FIG. 7 shows a flow chart of a complexity allocation process according to embodiments, such as process 600 shown in FIG. 6. The process shown in FIG. 7 can be executed by HEVC encoders and related devices, such as, e.g., device 110 shown in FIG. 1. At step 701, a CTU is selected for encoding. The CTU is a discrete block in a video frame, which is part of a video sequence in stream.

At step 702, a determination is made whether the CTU selected for encoding is a boundary CTU. If it is not, the process continues to step 703 where complexity estimation is performed. If it is, the process routes to step 708, and the special case, as described further herein, is executed with respect to boundary CTUs.

At step 703, if the selected CTU is not identified as a boundary CTU, complexity is estimated for the CTU. Accordingly, step 703 can involve steps described in the foregoing with respect to block 602 shown in FIG. 6, i.e., an estimated complexity is obtained for the CTU and the estimated value is used as a basis for subsequent steps.

At step 704, the value of the BiasBuffer is updated. The BiasBuffer is utilized to record complexity error between target complexity and actual complexity. At this step, the value of BiasBuffer is updated from the initial value obtained during the training phase.

At step 705, complexity is allocated to the selected CTU. As shown in the foregoing, in some embodiments the allocation depends upon the number of remaining CTUs to be encoded in the sequence. Also, the allocation is based upon the concept that a CTU with greater $T_E$ should be allocated more complexity because its prediction performance is poor and it likely requires more complexity to achieve an acceptable rate-distortion performance.

At step 706, parameter values are updated to reflect, e.g., that complexity error is gradually eliminated over subsequent CTUs. The ideal result is that the value of the BiasBuffer equals zero (0) after the last CTU of a video sequence is encoded. At the end of the encoding process of the selected CTU, the actual required time of the CTU, $T_c$ is obtained, and BiasBuffer is updated again.

At step 707, depth range selection is executed for the selected CTU in accordance with the foregoing description.

At step 708, the selected CTU is encoded and, in combination with step 709, a selection is made depending upon whether the CTU is a boundary CTU. If the selected CTU is a boundary CTU, then at step 710 a modified encoding process is executed where the BiasBuffer is updated as:

$$\text{BiasBuffer=BiasBuffer}+(1-r)^*T_A. \quad (19)$$

At step 711, if the selected CTU is not a boundary CTU, then encoding is completed and BiasBuffer is updated as:

$$\text{BiasBuffer=BiasBuffer}+(T_c-T_A). \quad (20)$$

At step 712, a determination is made whether CTUs remain to be encoded. If so, the process reverts to step 701. If not, the encoding process resolves at step 713.

Figure 8A:
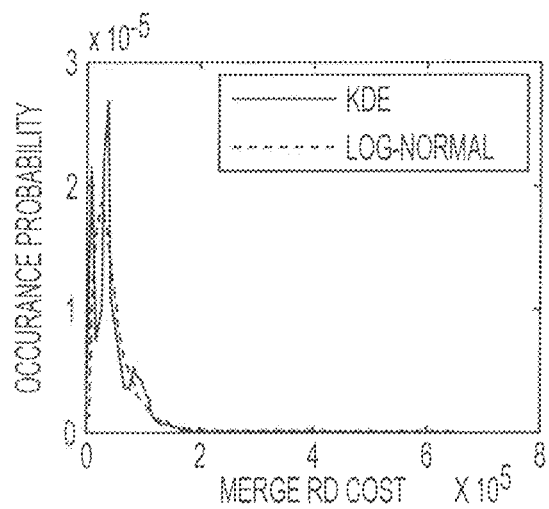
FIG. 8A shows a Probability Density Distribution (PDF) or occurrence probability as a function of a merge rate-distortion cost conditioned on a first AMD value according to embodiments described herein.
Figure 8B:
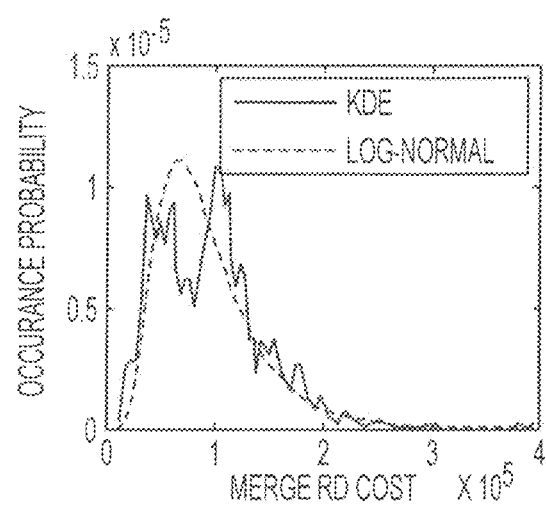
FIG. 8B shows a PDF or occurrence probability as a function of a merge rate-distortion cost conditioned on a second AMD value according to embodiments described herein.
Figure 8C:
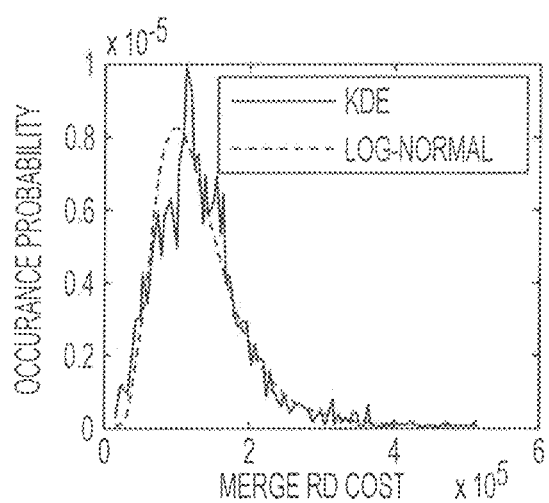
FIG. 8C shows a PDF or occurrence probability as a function of a merge rate-distortion cost conditioned on a third AMD value according to embodiments described herein.
Figure 8D:
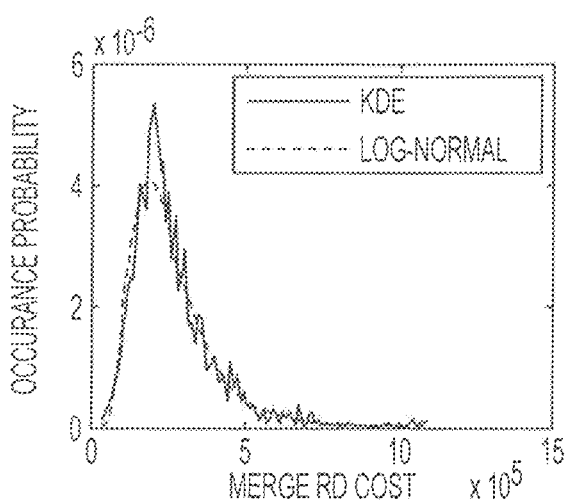
FIG. 8D shows a PDF or occurrence probability as a function of a merge rate-distortion cost conditioned on a fourth AMD according to embodiments described herein.

FIG. 8A shows a Probability Density Distribution (PDF) or occurrence probability as a function of a merge rate-distortion cost conditioned on a first AMD value. FIG. 8B shows a PDF or occurrence probability as a function of a merge rate-distortion cost conditioned on a second AMD value. FIG. 8C shows a PDF or occurrence probability as a function of a merge rate-distortion cost conditioned on a third AMD value. FIG. 8D shows a PDF or occurrence probability as a function of a merge rate-distortion cost conditioned on a fourth AMD value. In each of the foregoing FIGS. 8A-8D, solid lines represent the distribution generated by Kernel Density Estimation (KDE) and dashed lines represent fitting results of the log-normal distribution with the form:

$$p(x) = \begin{cases} 0 & x \leq 0 \\ \frac{1}{x\sqrt{2\pi\delta}} e^{\frac{-(lnx-\mu)^2}{2\delta^2}}, & x > 0, \end{cases} \quad (21)$$

$$\mu = \ln(E(X)) - \frac{1}{2}\ln\left(1 + \frac{\text{Var}(X)}{E^2(X)}\right), \quad (22)$$

$$\delta^2 = \ln\left(1 + \frac{\text{Var}(X)}{E^2(X)}\right), \quad (23)$$

where E(X) and Var(X) are the mean and variance of the samples, respectively. From FIG. 8, it can be concluded that the log-normal distribution can fit the PDFs of the merge rate-distortion cost conditioned on different AMDs well.

Aspects of embodiments implement an accelerated error elimination, an example of which is referred to as a fast CU decision. Recall that, as illustrated at FIG. 6 and described as part of the overall complexity control framework, a complexity error is recorded by a variable BiasBuffer. At the beginning of the testing phase, the additional time required by training frames is added to the BiasBuffer, which contains a considerable positive value. Moreover, although the existing time error can be eliminated in subsequent frames, additional time error typically occurs during the encoding process, e.g., additional time is required to encode boundary CTUs in each frame.

To ensure that additional time error is eliminated at a satisfactory rate and does not counteract the complexity budget for subsequent frames, a fast CU decision is introduced and is enabled when the value of the BiasBuffer is positive. As such, when the fast CU decision is enabled, the CTU depth range is constrained and part of the quadtree that belongs to the constrained depth range is not fully traversed.

This early CU decision scheme is also based on the PDFs of the merge rate-distortion cost, which is the rate-distortion cost of PU mode merge 2N×2N. Instead of being conditioned on the AMDs, they are conditioned on whether or not the CU splits in the optimal CU partitioning solution. Embodiments can determine the PDFs of the merge rate-distortion cost, conditioned on the split status of the CU with different QPs, CU sizes, and temporal layers.

Further, the testing condition and testing sequences are the same with those discussed above. Experimental results show that these PDFs can still be fitted by the log-normal distribution, and the PDFs of CUs with size equal to 64, QP equal to 22, and temporal layer equal to 3. This is shown in FIG. 9, where mergeRD represents the merge rate-distortion cost of the CU. The labels Split and Unsplit indicate whether the CU is optimal. In particular, the PDFs in other cases have the same characteristics and are not listed for brevity. It can be observed that the merge rate-distortion cost of unsplit CUs are relatively centralized at a small value. However, the PDF of split CUs spreads to a wide range. In other words, the two (2) kinds of CUs are separable based on their merge rate-distortion cost values. The posterior probability can be calculated as $$p(Unsplit|mergeRD) = \frac{p(mergeRD|Unsplit)p(Unsplit)}{p(mergeRD)} \quad (24)$$

$$P(mergeRD) = \\ p(mergeRD|Unsplit)p(Unsplit) + p(mergeRD|Split)(1 - p(Unsplit)), \quad (25)$$

where p(Unsplit) is the percentage of optimal CUs with the corresponding size.

If the posterior probability p(Unsplit|mergeRD) is large, the CU is very unlikely to split into CUs of smaller sizes. Otherwise if p(Unsplit|mergeRD) is very small, the prediction performance of the current CU is poor and is very likely to split. As such, two thresholds, TH1 and TH2, are set to this probability to perform a fast CU decision. If p(Unsplit|mergeRD) is greater than TH1, the CU is determined to be the optimal one and its subCUs will not be checked again. This can be referred to as early CU pruning.

If p(Unsplit|mergeRD) is smaller than TH2, the remaining PUs of the current CU will not be checked and the CU will split into four (4) subCUs directly, this can be referred to as early CU skipping. This fast CU decision scheme accelerates the speed of complexity error elimination; however, degradation of the rate-distortion performance should not be introduced. Accordingly, two (2) conservative values, 0.95 and 0.05, are set as thresholds, respectively. Parameters for the log-normal distributions can be derived offline while the prior probabilities are calculated in the training phase.

With regard to obtaining test result of embodiments, test can be carried out using HM-16.9. To perform a fair comparison, the configuration of the encoder strictly complies with the Common Test Conditions (CTC). The Complexity Reduction (CR) of each testing sequence is calculated as:

$$CR = \frac{T_{ori} - T_{cc}}{T_{ori}} \times 100\% \quad (26)$$

where $T_{ori}$ is the original encoding time of HM-16.9 without any modification, and Tcc is the encoding time after complexity control is enabled with a given complexity ratio. More specifically, the ultimate CR of a sequence with a specific complexity ratio is obtained by averaging the CRs of four (4) QPs, namely 22, 27, 32, 37. As a good complexity control method should be able to maximize the rate-distortion performance while exactly reaching the target complexity ratio for every video sequence, three (3) criteria, rate-distortion performance, complexity control accuracy, and complexity control stability are evaluated, for which the measurements are the BDBR increment, Complexity Error (CE), and Standard Deviation (SD), respectively. CE and SD are calculated as follows:

$$CE = |r - \text{mean}|, \quad (27)$$

$$SD = \sqrt{\frac{1}{n}\sum_{i=1}^{n}(CR_i - \text{mean})^2}, \quad (28)$$

where r is the target complexity ratio and n is the number of testing sequences. The symbol $CR_i$ is the CR of the ith testing sequence. The mean CR value of all the testing sequences is denoted by mean, which is calculated as $$\text{mean} = \frac{1}{n}\sum_{i=1}^{n} CR_i, \quad (29)$$

As our complexity control method is especially targeted for real-time and power/resource-limited video applications, the "encoder lowdelay P main" configuration is adopted to test performance.

As for the testing sequence in Class D (240P), the minimum complexity when only checking Depth 0 for each CTU is more than 30%, three (3) target complexity ratios, namely 80%, 60%, 40%, are discussed here. Three (3) state-of-the-art methods, denoted as Correa DCC, Deng TCSVT, and Amaya TMM are implemented for fair comparison. Among them, Correa DCC is a classical work that proposed to achieve complexity control by limiting the CTU depth range. Deng TCSVT is a recent process-simplification-based method, which allocates the complexity to each CTU based on the saliency detection and Amaya TMM controls the complexity by adjusting the thresholds of a fast CU decision method.

The detailed results are listed in Table III, Table IV, and Table V for target complexity ratios 80%, 60%, 40%, respectively.

TABLE III

Performance comparison with the target complexity ratio equal to 80%.

| Test sequences | | Correa_DCC [21] | | Deng_TCSVT [19] | | Amaya_TMM [20] | | Proposed Method | |
|---|---|---|---|---|---|---|---|---|---|
| | | BDBR (%) | CR (%) | BDBR (%) | CR (%) | BDBR (%) | CR (%) | BDBR (%) | CR (%) |
| Class B | Kimono | 0.51 | 20.66 | 0.21 | 17.30 | 0.20 | 17.23 | 0.44 | 23.39 |
| | ParkScene | 4.17 | 21.05 | 1.33 | 15.77 | 0.14 | 17.97 | 0.32 | 24.60 |
| | Cactus | 1.26 | 20.03 | 1.25 | 14.61 | 0.18 | 14.58 | 0.17 | 24.54 |

TABLE III-continued

Performance comparison with the target complexity ratio equal to 80%.

| | | Correa_DCC [21] | | Deng_TCSVT [19] | | Amaya_TMM [20] | | Proposed Method | |
|---|---|---|---|---|---|---|---|---|---|
| | Test sequences | BDBR (%) | CR (%) | BDBR (%) | CR (%) | BDBR (%) | CR (%) | BDBR (%) | CR (%) |
| | BasketballDrive | 5.50 | 27.00 | 0.84 | 14.25 | 0.17 | 17.21 | 0.23 | 21.20 |
| | BQTerrace | 1.08 | 15.48 | 0.77 | 15.19 | 0.23 | 19.79 | 0.28 | 21.67 |
| Class C | BasketballDrive | 14.06 | 29.87 | 2.65 | 17.19 | 0.52 | 17.04 | 0.29 | 20.56 |
| | BQMall | 25.50 | 33.83 | 3.97 | 17.57 | 0.76 | 21.60 | 0.59 | 24.59 |
| | PartyScene | 26.66 | 36.58 | 3.99 | 17.86 | 3.63 | 23.99 | 0.17 | 21.28 |
| | RaceHorsesC | 14.56 | 21.05 | 3.92 | 20.03 | 0.79 | 21.36 | 0.30 | 23.39 |
| Class D | BasketballPass | 18.38 | 24.79 | — | — | 0.81 | 22.37 | 0.64 | 26.90 |
| | BQSquare | 17.00 | 20.49 | — | — | 1.83 | 21.31 | 0.02 | 19.08 |
| | BlowingBubbles | 18.96 | 26.47 | — | — | 2.01 | 23.36 | 0.42 | 22.71 |
| | RaceHorses | 19.31 | 17.62 | — | — | 1.75 | 15.98 | 0.52 | 23.40 |
| Class E | FourPeople | 1.28 | 19.75 | 0.54 | 18.68 | 0.18 | 21.59 | 1.24 | 19.90 |
| | Johnny | 1.23 | 16.30 | 0.08 | 19.29 | −0.15 | 20.60 | 1.32 | 19.29 |
| | KristenAndSara | 1.79 | 19.77 | 0.48 | 19.66 | 0.18 | 19.49 | 1.10 | 19.47 |
| | Overall | 10.64 | 23.17 (6.11) | 1.67 | 17.3 (1.97) | 0.83 | 19.72 (2.76) | 0.50 | 22.27 (2.33) |

TABLE IV

Performance comparison with the target complexity ratio equal to 60%.

| | | Correa_DCC [21] | | Deng_TCSVT [19] | | Amaya_TMM [20] | | Proposed Method | |
|---|---|---|---|---|---|---|---|---|---|
| | Test sequences | BDBR (%) | CR (%) | BDBR (%) | CR (%) | BDBR (%) | CR (%) | BDBR (%) | CR (%) |
| Class B | Kimono | 2.12 | 39.32 | 0.92 | 37.55 | 0.81 | 41.86 | 0.98 | 41.65 |
| | ParkScence | 12.86 | 40.96 | 5.20 | 38.41 | 3.43 | 45.49 | 1.76 | 42.79 |
| | Cactus | 13.87 | 39.46 | 4.98 | 37.57 | 1.52 | 38.52 | 1.72 | 42.59 |
| | BasketballDrive | 12.59 | 49.24 | 3.96 | 34.90 | 1.09 | 38.87 | 1.95 | 38.99 |
| | BQTerrace | 10.32 | 39.29 | 2.98 | 37.74 | 7.50 | 53.40 | 2.02 | 40.43 |
| Class C | BasketballDrill | 29.13 | 46.82 | 9.05 | 37.41 | 3.63 | 39.32 | 2.60 | 39.54 |
| | BQMall | 20.65 | 55.13 | 14.31 | 37.83 | 7.66 | 43.89 | 2.98 | 42.90 |
| | PartyScene | 38.08 | 52.46 | 13.93 | 38.87 | 18.95 | 49.19 | 1.43 | 39.92 |
| | RaceHorsesC | 30.43 | 40.60 | 12.29 | 38.52 | 12.94 | 46.35 | 1.95 | 41.57 |
| Class D | BasketballPass | 42.76 | 43.55 | — | — | 4.03 | 36.25 | 2.08 | 44.21 |
| | BQSquare | 44.40 | 43.30 | — | — | 9.16 | 38.97 | 1.44 | 38.65 |
| | BlowingBubbles | 32.25 | 45.15 | — | — | 7.96 | 40.28 | 1.90 | 40.73 |
| | RaceHorses | 42.17 | 35.02 | — | — | 7.87 | 34.64 | 1.35 | 41.73 |
| Class E | FourPeople | 12.84 | 40.26 | 2.57 | 41.20 | 0.87 | 45.23 | 3.06 | 39.11 |
| | Johnny | 10.48 | 38.30 | 1.75 | 41.20 | −0.04 | 40.58 | 2.64 | 38.04 |
| | KristenAndSara | 11.76 | 39.49 | 2.20 | 41.72 | 0.36 | 39.36 | 2.58 | 39.07 |
| | Overall | 24.79 | 43.02 (5.48) | 6.17 | 38.57 (1.95) | 5.48 | 42.05 (4.91) | 2.03 | 40.75 (1.81) |

TABLE V

Performance comparison with the target complexity ratio equal to 40%.

| | | Correa_DCC [21] | | Deng_TCSVT [19] | | Amaya_TMM [20] | | Proposed Method | |
|---|---|---|---|---|---|---|---|---|---|
| | Test sequences | BDBR (%) | CR (%) | BDBR (%) | CR (%) | BDBR (%) | CR (%) | BDBR (%) | CR (%) |
| Class B | Kimono | 7.82 | 61.37 | 3.43 | 58.60 | 5.77 | 68.32 | 2.29 | 60.01 |
| | ParkScence | 27.67 | 62.07 | 14.42 | 58.04 | 25.28 | 73.08 | 3.93 | 59.33 |
| | Cactus | 34.24 | 62.62 | 15.97 | 57.35 | 19.83 | 68.32 | 3.79 | 58.71 |
| | BasketballDrive | 24.50 | 65.24 | 12.80 | 56.76 | 11.33 | 61.30 | 3.93 | 58.06 |
| | BQTerrace | 15.33 | 55.92 | 11.45 | 58.24 | 17.04 | 74.23 | 5.16 | 57.49 |
| Class C | BasketballDrill | 42.59 | 61.83 | 22.84 | 56.33 | 20.41 | 60.54 | 5.56 | 58.44 |
| | BQMall | 61.08 | 62.19 | 32.10 | 55.06 | 35.74 | 63.64 | 7.46 | 60.11 |
| | PartyScene | 47.30 | 62.17 | 28.88 | 57.80 | 36.69 | 62.65 | 5.88 | 57.50 |
| | RaceHorsesC | 46.81 | 59.17 | 26.51 | 55.39 | 41.12 | 66.14 | 6.29 | 59.43 |
| Class D | BasketballPass | 61.18 | 58.60 | — | — | 10.90 | 45.53 | 4.89 | 60.17 |
| | BQSquare | 70.52 | 59.20 | — | — | 16.66 | 47.72 | 4.38 | 56.51 |

TABLE V-continued

Performance comparison with the target complexity ratio equal to 40%.

|  | Test sequences | Correa_DCC [21] | | Deng_TCSVT [19] | | Amaya_TMM [20] | | Proposed Method | |
|---|---|---|---|---|---|---|---|---|---|
|  |  | BDBR (%) | CR (%) | BDBR (%) | CR (%) | BDBR (%) | CR (%) | BDBR (%) | CR (%) |
|  | BlowingBubbles | 43.87 | 56.71 | — | — | 16.85 | 51.06 | 6.53 | 54.78 |
|  | RaceHorses | 71.27 | 55.86 | — | — | 26.42 | 48.13 | 7.21 | 55.93 |
| Class E | FourPeople | 22.86 | 65.98 | 10.29 | 63.71 | 9.71 | 70.02 | 6.07 | 57.96 |
|  | Johnny | 20.41 | 62.98 | 8.63 | 63.64 | 6.69 | 69.76 | 5.88 | 57.47 |
|  | KristenAndSara | 22.28 | 63.99 | 10.31 | 64.05 | 4.00 | 69.02 | 5.49 | 57.75 |
|  | Overall | 38.73 | 60.99 | 16.47 | 58.75 | 19.05 | 62.47 | 5.30 | 58.11 |
|  |  |  | (3.12) |  | (3.23) |  | (9.43) |  | (1.53) |

In the last line of the tables the mean values of BDBR and CR are listed, with the SDs calculated in the brackets. For Correa DCC, the three (3) tables show that the BDBR increment is up to 10.64% even when the target complexity ratio is 80%. The BDBR increment still goes up significantly as the target complexity ratio drops, which indicates that this implementation is less efficient in maintaining the rate-distortion performance. This is mainly because of the simple and crude way this implementation adopts to limit the maximum CTU depth and no complexity allocation is performed. The CEs are acceptable, which are 3.17%, 3.02% and 0.99% for target complexity ratios 80%, 60% and 40%, respectively. However, the SDs of the three (3) target complexity ratios are 6.11%, 5.48% and 3.12%, which are too large for a stable complexity control accuracy for any given video sequence.

Deng TCSVT cannot work well on Class D because of the too small frame size and large boundary areas. As such, the results of Deng TCSVT on Class D are not listed. Even though the results of Class D are removed, the average BDBR increments of the three (3) target ratios is still larger than those of Amaya TMM. Two (2) important reasons are that the CTUs are always checking form Depth 0 and the distortion-depth relationship can hardly incorporate the consumed bits. The CE and SD values for different target complexity ratios are comparable with disclosed embodiments, but this is based on the condition that the results of Class D are not included.

Amaya TMM can achieve a comparable result with disclosed embodiments when the target complexity ratio is sufficient (80%). However, the performance degrades rapidly as the target complexity ratio decreases, which is mainly because of the lack of an effective complexity allocation mechanism. At the same time, the large SDs show that the complexity control stability is weak. Actually, the complexity control accuracy completely relies on the feedback mechanism and only a very simple complexity estimation is adopted herein, which is based on the assumption that each CTU consumes the same amount of encoding time.

As seen, the inventive concepts achieve the best performance among all the discussed implementations. The BDBR increments are always the smallest for all target complexity ratios. Especially when the target complexity ratio is 40%, the BDBR increment is 5.30%, which is far smaller than those of other methods. The largest CE (2.27%) and largest SD (2.33%) occur when the target complexity ratio is 80%, which is still comparable to the best results of other reference methods.

As shown herein, disclosed embodiments outperform known systems in all the three (3) criteria: BDBR increment, CE, and SD. Additional experimental results are provided to manifest that the superior results derive from the effectiveness of our algorithm.

According to described embodiments, the BDBR degrades far more slowly as the target complexity ratio drops. This is due to reasonable complexity allocation and depth range adjustment schemes. For a better demonstration, CU partitioning results are listed in FIG. 10. The encoded frame in FIG. 10 is the $31^{st}$ frame of the testing sequence BasketballDrill with QP equal to 37. Among the five (5) pictures, FIG. 10A is the benchmark given by the original HM encoder without complexity constraint, and the remaining four (4) pictures are the encoding results of Correa DCC, Deng TCSVT, Amaya TMM according to described embodiments, respectively.

A target complexity ratio is set to an extremely challenging value, 40%, which can roughly afford to check two (2) CTU depth for each CTU at most. The thick lines in FIG. 10 are the CTU boundary and the thin lines are the CTU partitioning results. The result of Correa DCC (FIG. 10B shows that all the CTUs are encoded with Depth 0 except the boundary CTUs. This is because there is no complexity allocation step in this method and the previous frames consume too much complexity budget.

In FIG. 10C, the AMDs of all the CTUs are not greater than one (1), although in FIG. 10A some CTUs contain CUs with Depth 2 and 3. As the complexity of each CTU is limited and Deng TCSVT always starts encoding from Depth 0, the maximum depth may never be checked even if it can provide better Rate-distortion performance. The result of Amaya is better than that of Deng TCSVT by comparing FIG. 10D with FIG. 10C as some CUs with Depth 2 and 3 appear. However, most regions with considerable details, which can be observed from FIG. 10A, are still encoded with much larger CUs. The main reason is that the thresholds of the fast CU decision are adjusted by a very simple and empirical way. Actually, the precondition of a good result of this method is that the relationship between the threshold and the rate-distortion performance is known. But such relationships are unlikely to be obtained in advance and the interaction between the thresholds of different depth is very complex. The majority of CUs with depth equal to 2 and 3 appear in results shown in FIG. 10E and CTUs found in non-homogeneous regions finely split into small size CUs.

To further analyze the complexity control accuracy and stability of described embodiments, the values of BiasBuffer are recorded, as this variable plays an important role in complexity allocation and complexity error elimination. In FIG. 11, the changing curves of BiasBuffer for four (4) different testing video sequences with 100 frames, namely Catus, ParkScene, RaceHorsesC and BQSquare are presented. FIG. 11A shows bias buffer time as a function of frame order for a first set of buffer time values with different target complexity ratios in a first testing video sequence. FIG. 11B shows bias buffer time as a function of frame order for a second set of buffer time values with different target complexity ratios in a second testing video sequence. FIG. 11C shows bias buffer time as a function of frame order for a third set of buffer time values with different target complexity ratios in a third testing video sequence. FIG. 11D shows bias buffer time as a function of frame order for a fourth set of buffer time values with different target complexity ratios in a fourth testing video sequence. The curves for target complexity ratios 80%, 60% and 40% are denoted with asterisks, diamonds and + signs.

All curves have start at zero (0), and then they rise steeply during the first a few frames. This is because these frames belong to the training phase and the additional time required by these frames are directly added to the BiasBuffer. After the training phase, the curve changes can represent the control ability. All four (4) solid curves with the target complexity ratio equal to 80% quickly drop to 0 and steadily keep this value until the encoding process ends. Because of the acceleration of error elimination, the extra time required by the training stage can be fast balanced. For the target complexity ratio 60%, the dashed curves in FIG. 11A and FIG. 11B will keep dropping to a negative extremum, which indicates that the encoding process goes faster than expected. This is mainly caused by the errors of the complexity estimation and mapping. However, these errors will not degrade the performance too much due to the feedback mechanism.

The dotted curves maintain at a high level for an extended time, which illustrates the situation that the target complexity ratio is extremely insufficient (40%). Because the target complexity ratio is very small, the extra time required by the training frames and the boundary CTUs in the following frames becomes very large. In addition to the feedback effect being weak in the beginning, BiasBuffer is difficult to balance even though the acceleration of error elimination is enabled. As the number of CTUs to be encoded decreases, the feedback effect becomes stronger and the complexity error converges to 0 at an increasing rate. At the end of the encoding process, most of the curves converge to zero (0), which indicates that the control accuracy and stability are mostly determined by the accuracy of the complexity estimation of our method. In sum, the analysis of the intermediate experimental results demonstrate the effectiveness of described embodiments.

As seen, embodiments provide a complexity control method for HEVC by adjusting the depth range for each CTU. To reach the target complexity ratio accurately, the CTU-level complexity estimation is performed and a statistical model is derived. Then the complexity budget of the whole sequence is allocated to each CTU proportionally to its estimated complexity. With the allocated complexity, a probability-based CTU depth range adjustment strategy is proposed to determine an optimal depth range for the CTU. A feedback-based complexity control framework is adopted so that the complexity error can be eliminated in time. Extensive experiments have been done to compare the results of our method with those of the other three state-of-the-art methods. The experimental results demonstrate that embodiments achieve superior performance with all the three criteria, namely rate-distortion performance, complexity control accuracy, and complexity control stability. Moreover, detailed analysis based on some intermediate results are also provided to better evaluate our method.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method for complexity control in high efficiency video coding, the method comprising:
   identifying, within a received video sequence, one or more coding tree units to be encoded;
   obtaining an estimated coding complexity required to encode the identified one or more coding tree units;
   based on the estimated coding complexity, obtaining an allocated coding complexity to encode the identified one or more coding tree units;
   based on the allocated coding complexity, selecting a depth range for the identified one or more coding tree units;
   encoding the identified one or more coding tree units according to the selected depth range; and
   mapping encoding complexity of each selected depth range for the identified one or more coding tree units to one of a plurality of complexity ratios, where each complexity ratio in the plurality of complexity ratios is a ratio between allocated complexity, $T_A$, that is allocated to a coding tree unit to be encoded and estimated complexity $T_E$ that is estimated for the coding tree unit to be encoded and corresponds to a quantified coding tree unit depth.

2. The method of claim 1 where selecting a depth range for the identified one or more coding tree units comprises simultaneously selecting a minimum depth and a maximum depth for the identified one or more coding tree units.

3. The method of claim 1 where obtaining an estimated coding complexity is based, at least in part, on content of the identified one or more coding tree units.

4. The method of claim 3 further comprising:
   allocating a complexity budget to each of the identified one or more coding tree units in proportion to the estimated coding complexity for each of the identified one or more coding tree units; and
   a bit-time model is utilized to estimate the estimated coding complexity for each of the identified one or more coding tree units.

5. The method of claim 1 where obtaining an allocated coding complexity is further based on a comparison of a bias buffer value and a target complexity ratio.

6. The method of claim 5 further comprising
updating the bias buffer value based on an actual complexity of the identified one or more coding tree units; and
re-allocating coding complexity to the identified one or more coding tree units based on a comparison of the updated bias buffer value and the target complexity ratio.

7. A system for complexity control in high efficiency video coding, the system comprising:
a memory;
one or more processors coupled to the memory, the one or more processors:
identifying, within a received video sequence, one or more coding tree units to be encoded;
obtaining an estimated coding complexity required to encode the identified one or more coding tree units;
based on the estimated coding complexity, obtaining an allocated coding complexity to encode the identified one or more coding tree units;
based on the allocated coding complexity, selecting a depth range for the identified one or more coding tree units;
encoding the identified one or more coding tree units according to the selected depth range; and
mapping encoding complexity of each selected depth range for the identified one or more coding tree units to one of a plurality of complexity ratios, where each complexity ratio in the plurality of complexity ratios is a ratio between allocated complexity, $T_A$, that is allocated to a coding tree unit to be encoded and estimated complexity $T_E$ that is estimated for the coding tree unit to be encoded and corresponds to a quantified coding tree unit depth.

8. The system of claim 7 where selecting a depth range for the identified one or more coding tree units comprises simultaneously selecting a minimum depth and a maximum depth for the identified one or more coding tree units.

9. The system of claim 7 where obtaining an estimated coding complexity is based, at least in part, on content of the identified one or more coding tree units.

10. The system of claim 9 further comprising:
allocating a complexity budget to each of the identified one or more coding tree units in proportion to the estimated coding complexity for each of the identified one or more coding tree units; and
a bit-time model is utilized to estimate the estimated coding complexity for each of the identified one or more coding tree units.

11. The system of claim 7 where obtaining an allocated coding complexity is further based on a comparison of a bias buffer value and a target complexity ratio.

12. The system of claim 11 further comprising
updating bias buffer value based on an actual complexity of the identified one or more coding tree units; and
re-allocating coding complexity to the identified one or more coding tree units based on a comparison of the updated bias buffer value and the target complexity ratio.

13. A non-transitory computer-readable storage medium storing instructions that, when executed by one or more processors, cause the one or more processors to perform operations for complexity control in high efficiency video coding, the operations comprising:
identifying, within a received video sequence, one or more coding tree units to be encoded;
obtaining an estimated coding complexity required to encode the identified one or more coding tree units;
based on the estimated coding complexity, obtaining an allocated coding complexity to encode the identified one or more coding tree units;
based on the allocated coding complexity, selecting a depth range for the identified one or more coding tree units;
encoding the identified one or more coding tree units according to the selected depth range; and
mapping encoding complexity of each selected depth range for the identified one or more coding tree units to one of a plurality of complexity ratios, where each complexity ratio in the plurality of complexity ratios is a ratio between allocated complexity, $T_A$, that is allocated to a coding tree unit to be encoded and estimated complexity $T_E$ that is estimated for the coding tree unit to be encoded and corresponds to a quantified coding tree unit depth.

14. The method of claim 1 where selecting a depth range for the identified one or more coding tree units comprises simultaneously selecting a minimum depth and a maximum depth for the identified one or more coding tree units.

15. The method of claim 1 where obtaining an estimated coding complexity is based, at least in part, on content of the identified one or more coding tree units.

16. The method of claim 3 further comprising:
allocating a complexity budget to each of the identified one or more coding tree units in proportion to the estimated coding complexity for each of the identified one or more coding tree units; and
a bit-time model is utilized to estimate the estimated coding complexity for each of the identified one or more coding tree units.

17. The method of claim 1 where obtaining an allocated coding complexity is further based on a comparison of a bias buffer value and a target complexity ratio.

18. The method of claim 5 further comprising
updating the bias buffer value based on an actual complexity of the identified one or more coding tree units; and
re-allocating coding complexity to the identified one or more coding tree units based on a comparison of the updated bias buffer value and the target complexity ratio.

* * * * *